US011670994B2

United States Patent
Akaishi (10) Patent No.: US 11,670,994 B2
(45) Date of Patent: Jun. 6, 2023

(54) ROTOR MANUFACTURING METHOD

(71) Applicant: TOYOTA JIDOSHA KABUSHIKI KAISHA, Toyota (JP)

(72) Inventor: Masayuki Akaishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/661,662

(22) Filed: May 2, 2022

(65) Prior Publication Data

US 2022/0376590 A1 Nov. 24, 2022

(30) Foreign Application Priority Data

May 20, 2021 (JP) .............................. JP2021-085038

(51) Int. Cl.
*H02K 15/03* (2006.01)
*H02K 15/12* (2006.01)

(52) U.S. Cl.
CPC ............ *H02K 15/03* (2013.01); *H02K 15/12* (2013.01); *Y10T 29/49012* (2015.01)

(58) Field of Classification Search
CPC ...... H02K 15/03; H02K 1/2706; H02K 1/276; Y10T 29/49826; Y10T 29/49012; Y10T 29/5313; F05B 2220/7068; F16C 2380/26; F16C 39/063

USPC .......... 29/598, 596, 604, 607, 729, 732, 738
See application file for complete search history.

(56) References Cited

U.S. PATENT DOCUMENTS

| 9,712,025 | B2 * | 7/2017 | Hasegawa | ............... | H02K 15/03 |
| 10,326,342 | B2 * | 6/2019 | Kino | ..................... | H02K 1/2706 |
| 2016/0049851 | A1 | 2/2016 | Hasegawa et al. | | |

FOREIGN PATENT DOCUMENTS

| JP | 9-163649 A | 6/1997 |
| JP | 5967297 B2 | 8/2016 |

* cited by examiner

*Primary Examiner* — Thiem D Phan
(74) *Attorney, Agent, or Firm* — Oblon, McClelland, Maier & Neustadt, L.L.P.

(57) ABSTRACT

A rotor manufacturing method comprises an arranging step for arranging a rotor core, which is formed by stacking electromagnetic steel plates, to direct the stacked electromagnetic steel plates toward a vertical direction, a guide inserting step for inserting a rod-like guide into a magnet insertion hole formed to extend in the stacked direction of the rotor core after the arranging step, a sheet inserting step for inserting a plurality of sheets from above the rotor core into the magnet insertion hole along different side surfaces of the guide after the guide inserting step, a guide pull-out step for pulling out the guide from the magnet insertion hole after the sheet inserting step, and a magnet inserting step for inserting a permanent magnet between the plurality of sheets within the magnet insertion hole after the guide pull-out step.

5 Claims, 13 Drawing Sheets

ROTOR MANUFACTURING METHOD

CROSS REFERENCE TO RELATED APPLICATION

This application claims priority to Japanese Patent Application No. 2021-085038 filed on May 20, 2021, which is incorporated herein by reference in its entirety including the specification, claims, drawings, and abstract.

TECHNICAL FIELD

The present disclosure relates to a rotor manufacturing method and a rotor manufacturing apparatus, and particularly to a method and apparatus for arranging sheets into magnet insertion holes of a rotor core.

BACKGROUND

Conventionally, a permanent magnet-embedded rotor is known for conventional rotating electric machines such as a motor, a generator, and the like. Such a type of rotor has a plurality of magnet insertion holes formed to extend in an axial direction (a stacked direction of electromagnetic steel plates) in a rotor core which is made of stacked annular electromagnetic steel plates, and permanent magnets are inserted into the respective magnet insertion holes. Some rotors have a sheet arranged between each permanent magnet and the inner surface of the corresponding magnet insertion hole, and the sheet is used to fix the permanent magnet in the magnet insertion hole and to insulate the permanent magnet from the inner surface of the magnet insertion hole.

JP 1997-163649A discloses a rotor with permanent magnets fixed to the inner surfaces of slit holes by attaching an adhesive sheet coated with an adhesive to the outer peripheral surface of each of the permanent magnets, inserting the permanent magnets into the slit holes (magnet insertion holes) of the rotor core, and curing the adhesive of the adhesive sheet.

CITATION LIST

PATENT LITERATURE: JP 1997-163649A

SUMMARY

Some rotor manufacturing methods insert a plurality of sheets, which correspond to a plurality of side surfaces of a permanent magnet, into a magnet insertion hole before the permanent magnet is inserted into the magnet insertion hole and then insert the permanent magnet between the plurality of sheets within the magnet insertion hole to arrange each sheet between one of the side surfaces of the permanent magnet and the inner surface of the magnet insertion hole.

The inner surface of the magnet insertion hole has minute irregularities, because a rotor core is made by stacking electromagnetic steel plates. In a case where the sheet is inserted into the magnet insertion hole independent of the permanent magnet according to the above-described rotor manufacturing method, there is a possibility that the sheet is bent or chipped, because when the sheet is inserted into the magnet insertion hole, the tip end portion of the sheet is moved toward the inner surface of the magnet insertion hole and caught by the irregularities of the surface of the magnet insertion hole. Therefore, there are demands for a rotor manufacturing method or a rotor manufacturing apparatus that can prevent the sheet from being bent or chipped when the sheet is inserted into the magnet insertion hole independent of the permanent magnet.

A rotor manufacturing method according to the present disclosure comprises an arranging step for arranging a rotor core, which is formed by stacking electromagnetic steel plates, to direct the stacked electromagnetic steel plates toward a vertical direction; a guide inserting step for inserting a rod-like guide into a magnet insertion hole formed to extend in the stacked direction of the rotor core after the arranging step; a sheet inserting step for inserting a plurality of sheets from above the rotor core into the magnet insertion hole along different side surfaces of the guide after the guide inserting step; a guide pull-out step for pulling out the guide from the magnet insertion hole after the sheet inserting step; and a magnet inserting step for inserting a permanent magnet between the plurality of sheets within the magnet insertion hole after the guide pull-out step.

In the rotor manufacturing method according to the present disclosure, there may be employed a configuration such that the guide is inserted into the magnet insertion hole from below the rotor core so to protrude as a guide protrusion portion a part of the guide from the upper end surface of the rotor core in the guide inserting step, and the plurality of sheets are fed onto different side surfaces of the guide protrusion portion from obliquely above in the sheet inserting step.

In the rotor manufacturing method according to the present disclosure, there may be employed a configuration such that in the sheet inserting step, the plurality of side surfaces of the guide along which the plurality of sheets are arranged are parallel to the inner surface of the magnet insertion hole which is opposite each of the side surfaces of the guide in a top view of the rotor core.

In the rotor manufacturing method according to the present disclosure, there may be employed a configuration such that when the sheet inserting step is completed, the plurality of sheets are extended toward the respective sheet feeding sources to widen upward above the magnet insertion hole, and in the magnet inserting step, the permanent magnet is inserted into the magnet insertion hole through the plurality of sheets widened upward.

In the rotor manufacturing method according to the present disclosure, there may be employed a configuration such that the respective sheets have a property of expanding by heating, and the rotor manufacturing method further comprises a sheet cutting step for cutting off the respective sheets on an upper end surface of the rotor core after the magnet inserting step, and a sheet heating step for heating the respective sheets within the magnet insertion hole after the sheet cutting step.

A rotor manufacturing apparatus according to the present disclosure comprises a holding member for holding a rotor core, which is made by stacking electromagnetic steel plates and has magnet insertion holes extending in the stacked direction of the electromagnetic steel plates, so that the stacked direction is directed to a vertical direction, a guide driving portion for inserting a rod-like guide into the magnet insertion holes of the rotor core being held by the holding member and pulling out the guide from the magnet insertion holes, a sheet feeding portion for feeding a plurality of sheets into the magnet insertion holes along different side surfaces of the guide from above the rotor core with the guide inserted into the magnet insertion hole, and a magnet feeding portion for feeding a permanent magnet between the plurality of sheets within the magnet insertion hole in a state where the plurality of sheets are fed into the magnet insertion hole and the guide is pulled out from the magnet insertion hole.

In the rotor manufacturing apparatus according to the present disclosure, there may be employed a configuration such that the guide driving portion feeds the guide into the magnet insertion hole from below the rotor core to protrude as a guide protrusion portion a part of the guide from an upper end surface of the rotor core, and the sheet feeding portion feeds the plurality of sheets to different side surfaces of the guide protrusion portion from obliquely above.

In the rotor manufacturing apparatus according to the present disclosure, there may be employed a configuration such that with the guide inserted into the magnet insertion hole, the plurality of side surfaces of the guide along which the plurality of sheets are arranged are parallel to the inner surface of the magnet insertion hole which is opposite each of the plurality of side surfaces of the guide in a top view of the rotor core.

In the rotor manufacturing apparatus according to the present disclosure, there may be employed a configuration such that when feeding of the respective sheets into the magnet insertion hole is completed, the plurality of sheets are extended toward the respective sheet feeding sources to widen upward above the magnet insertion hole, and the magnet feeding portion feeds the permanent magnet into the magnet insertion hole through the plurality of sheets widened upward.

In the rotor manufacturing apparatus according to the present disclosure, there may be employed a configuration such that the respective sheets have a property of expanding by heating, and the rotor manufacturing apparatus further comprises a cutter for cutting off the respective sheets on an upper end surface of the rotor core in a state where the permanent magnet is fed into the magnet insertion hole, and a heater for heating the respective sheets which are within the magnet insertion hole in a state where the respective sheets are cut off by the cutter.

According to the present disclosure, since the sheet is inserted along the guide into the magnet insertion hole, the tip end portion of the sheet can be prevented from moving toward the inner surface of the magnet insertion hole. Therefore, the tip end portion of the sheet can be prevented from being caught by the irregularities on the inner surface of the magnet insertion hole, so that the sheet can be prevented from being bent or chipped.

BRIEF DESCRIPTION OF DRAWINGS

Embodiments of the present disclosure will be described based on the following figures, wherein.

DESCRIPTION OF EMBODIMENTS

Embodiments according to the present disclosure are described below with reference to the drawings. The configuration described below is an example for illustration and can be modified appropriately in conformity with the specifications and the like of the rotor. In the following disclosure, it is assumed from the beginning that when a plurality of embodiments, modifications, or the like are described, their characteristic points can be combined appropriately. It is noted that like elements will be denoted by the same reference numerals in all of the figures, and repeated descriptions will be omitted.

In the following description, unless otherwise specified, terms for directions such as upper, lower, right, left, and the like indicate directions related to a rotor core 12 which is provided such that the stacked direction of electromagnetic steel plates 14 (see FIG. 1) faces a vertical direction.

Figure 1:
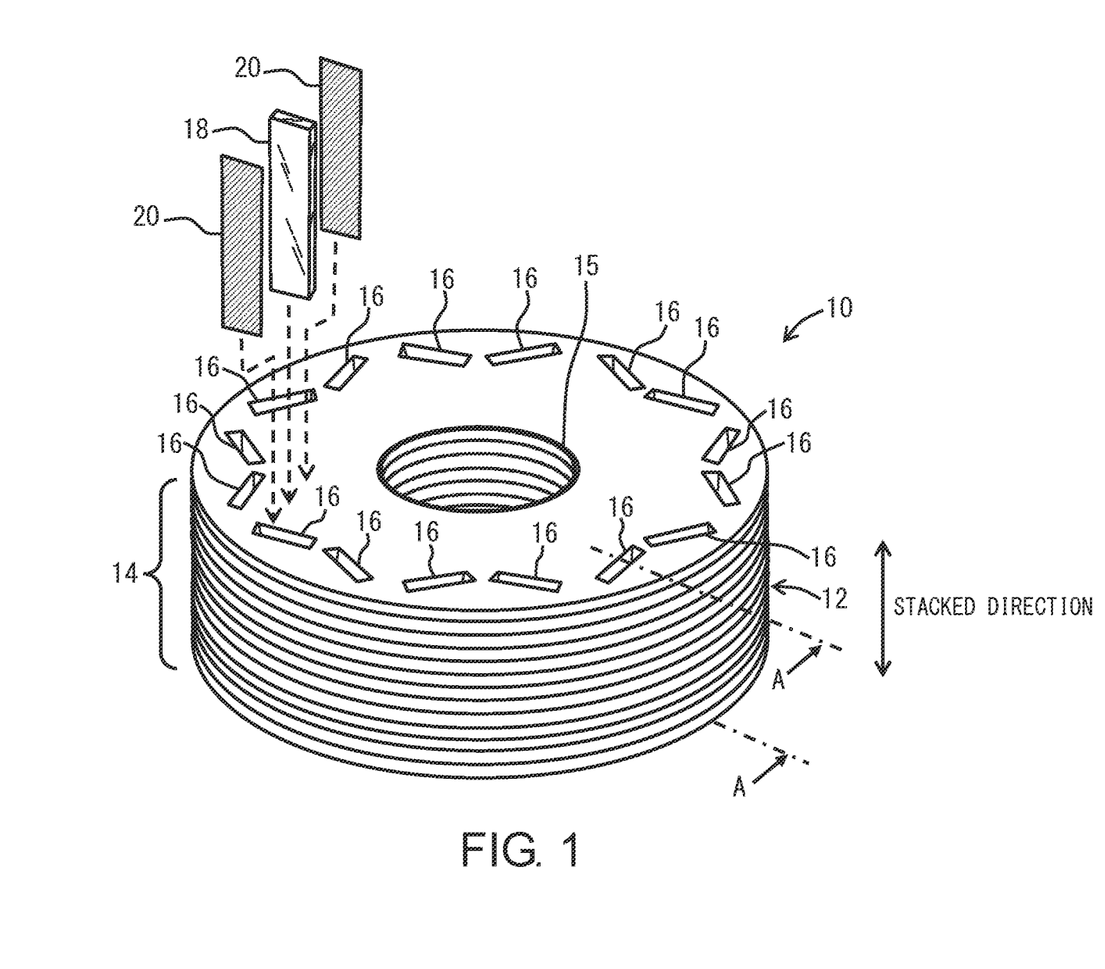
FIG. 1 is a perspective view of a rotor core before insertion of permanent magnets therein.

FIG. 1 is a perspective view of a rotor core 12 before insertion of a permanent magnet 18 therein. The permanent magnet 18 is inserted into each of a plurality of magnet insertion holes 16 formed in the rotor core 12 to configure a rotor 10 for a rotating electric machine. The rotor 10 includes a shaft (not shown) which is inserted through a shaft hole 15 of the rotor core 12 and fixed to its inner surface. An unshown cylindrical stator is provided around the rotor 10 across a prescribed gap therebetween to configure a rotating electric machine. When current is applied to the stator coil provided on the stator, a rotating magnetic field is generated inside the stator, and the rotor 10 is rotationally driven about the shaft.

The rotor core 12 is configured by axially stacking a large number of electromagnetic steel plates 14 which are formed by annularly punching silicon steel plates or the like having a thickness of one millimeter or less, for example. Respective figures including FIG. 1 illustrate the individual electromagnetic steel plates 14 in a relatively thicker form. The plurality of electromagnetic steel plates 14 configuring the rotor core 12 are integrally connected by a method of caulking, adhesion, welding, or the like for all of them collectively or for every block of the rotor core 12 divided plurally in the axial direction.

A shaft hole 15 having a circular shape is provided at the center of the rotor core 12, and the outer peripheral part of the rotor core 12 is provided with the plurality of magnet insertion holes 16 with intervals in the circumferential direction. The shaft hole 15 and the plurality of magnet insertion holes 16 each penetrate through the rotor core 12 in the axial direction (the same as the stacked direction of the electromagnetic steel plates 14) while keeping the same cross-sectional shape. In this embodiment, the respective magnet insertion holes 16 have the same size. The shape, size, and the like of the shaft hole 15 and the quantity, shape, size, position, and the like of the magnet insertion holes 16 are modified appropriately according to the specifications or the like of the rotating electric machine.

The permanent magnets 18 have a rectangular parallelepiped shape and are inserted into the magnet insertion holes 16 to form the magnetic pole of the rotor 10. The permanent magnets 18 have approximately the same vertical length as the magnet insertion holes 16. In this embodiment, the respective permanent magnets 18 have the same size. The shape, size, and the like of the permanent magnets 18 are modified appropriately according to the specifications or the like of the rotating electric machine.

Two sheets 20 are arranged on two side surfaces of the permanent magnet 18. The sheet 20 is an expansion sheet which is made of a material containing glass fibers and expanded by heat. The sheet 20 is pressed under strong force and also heated to have a thin form, and it becomes thick when it is inserted into the magnet insertion hole 16 and expanded by reheating.

Figure 2:
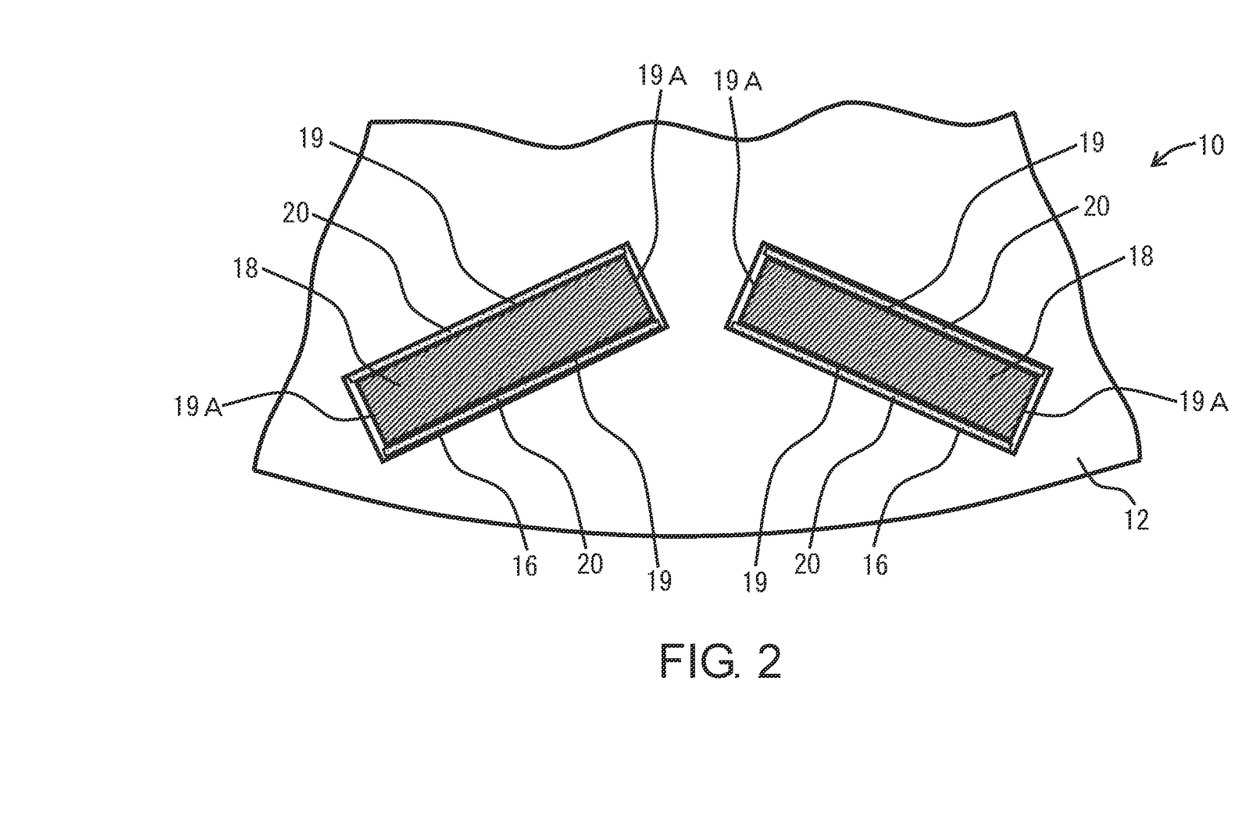
FIG. 2 is a top view partially showing a manufactured rotor.

FIG. 2 is a top view showing a part of the manufactured rotor 10, and there are shown two permanent magnets 18 which are inserted into two magnet insertion holes 16. As shown in the figure, the cross section of the permanent magnet 18 is slightly smaller than that of the magnet insertion hole 16. Each of the two sheets 20 is arranged between a side surface 19 of a long side (hereinafter referred to as the long-side side surface 19) of the permanent magnet 18 and the inner surface of the magnet insertion hole 16 in a top view of the rotor core 12. As described below in detail, the two sheets 20 are inserted into the magnet insertion hole 16 before the permanent magnet 18 is inserted into the magnet insertion hole 16, then the permanent magnet 18 is inserted between the two sheets 20 within the magnet insertion hole 16, and the two sheets 20 are heated. Thus, each of the two sheets is expanded to fill the gap between the long-side side surface 19 of the permanent magnet 18 and the inner surface of the magnet insertion hole 16, thereby fixing the permanent magnet 18 in the magnet insertion hole 16.

The sheet 20 also has a function of electrically insulating the long-side side surface 19 of the permanent magnet 18 and the inner surface of the rotor core 12. The sheet 20 may also have a form with a sponge-like cross section when it is expanded within the magnet insertion hole 16, and in that case, the sheet 20 can have air permeability and liquid permeability. Thus, when the rotating electric machine in which the manufactured rotor 10 is assembled is driven, air flows within the sheet 20, enabling provision of an effect of cooling the permanent magnet 18. Moreover, in a case where a cooling oil is supplied to the rotor 10, the cooling oil flows within the sheet 20 when the rotating electric machine is driven, and there can be provided an effect of cooling the permanent magnet 18. In the top view of the rotor core 12, the sheet may be arranged on a side surface 19A (hereinafter referred to as the short-side side surface 19A) of a short-side side of the permanent magnet 18, and its embodiment is described later.

Figure 3:
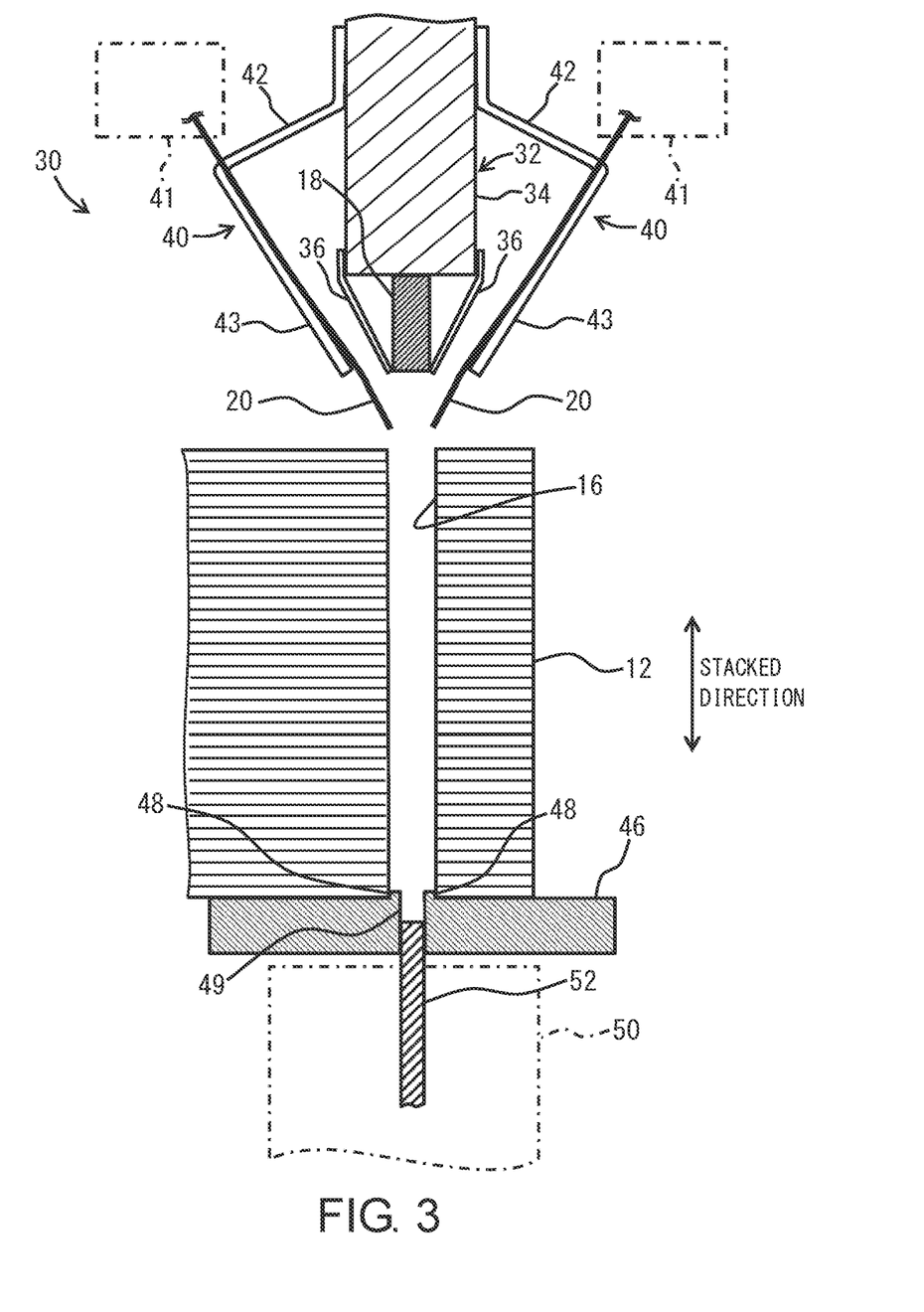
FIG. 3 is a schematic view of a rotor manufacturing apparatus.

A manufacturing method of the rotor 10 will now be described in detail. FIG. 3 is a figure schematically showing a rotor manufacturing apparatus 30 used for the rotor manufacturing. This figure also shows a cross section A-A of the end surface of the rotor core 12 of FIG. 1. The rotor manufacturing apparatus 30 is an apparatus for arranging the two sheets 20 and the permanent magnet 18 into the magnet insertion hole 16.

The rotor manufacturing apparatus 30 includes a stage 46 for supporting the rotor core 12, a rod-like guide 52 which is inserted into the magnet insertion hole 16 of the rotor core 12, a guide driving portion 50 for vertically driving the guide 52, a magnet feeding portion 32 arranged above the rotor core 12, and two sheet-feeding portions 40 which are positioned on respective sides of the magnet feeding portion 32. The guide 52 is provided for each of the magnet insertion holes 16 of the rotor core 12. This embodiment has only one upper set which consists of the magnet feeding portion 32 and the two sheet-feeding portions 40, but, as described later, the upper set may be provided in a plurality.

The stage 46 is a support member which has an annular shape in a top view and supports the lower end portion of the outer peripheral side of the rotor core 12 from below. The rotor core 12 is placed on the stage 46 so that the stacked direction of the electromagnetic steel plates is directed in the vertical direction. The stage 46 is formed to have holes 49 through which the guide 52 passes at positions corresponding to the respective magnet insertion holes 16 of the rotor core 12, and a protrusion 48 is formed around each of the holes 49 to protrude upward along the inner surface of the magnet insertion holes 16. The rotor core 12 is positioned on the stage 46 when each protrusion 48 of the stage 46 enters the corresponding magnet insertion hole 16 of the rotor core 12. The stage 46 also serves as a holding member for the rotor core 12.

Figure 4:
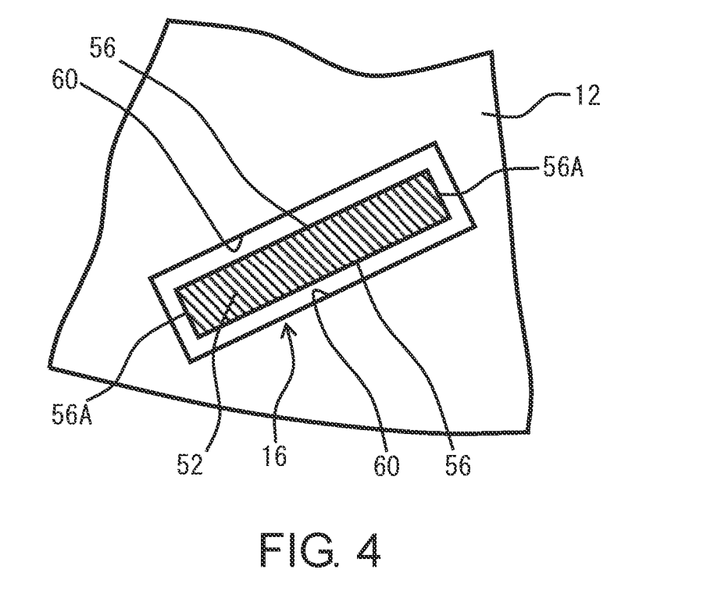
FIG. 4 is a top view of a rotor core showing a guide inserted into a magnet insertion hole.
Figure 7:
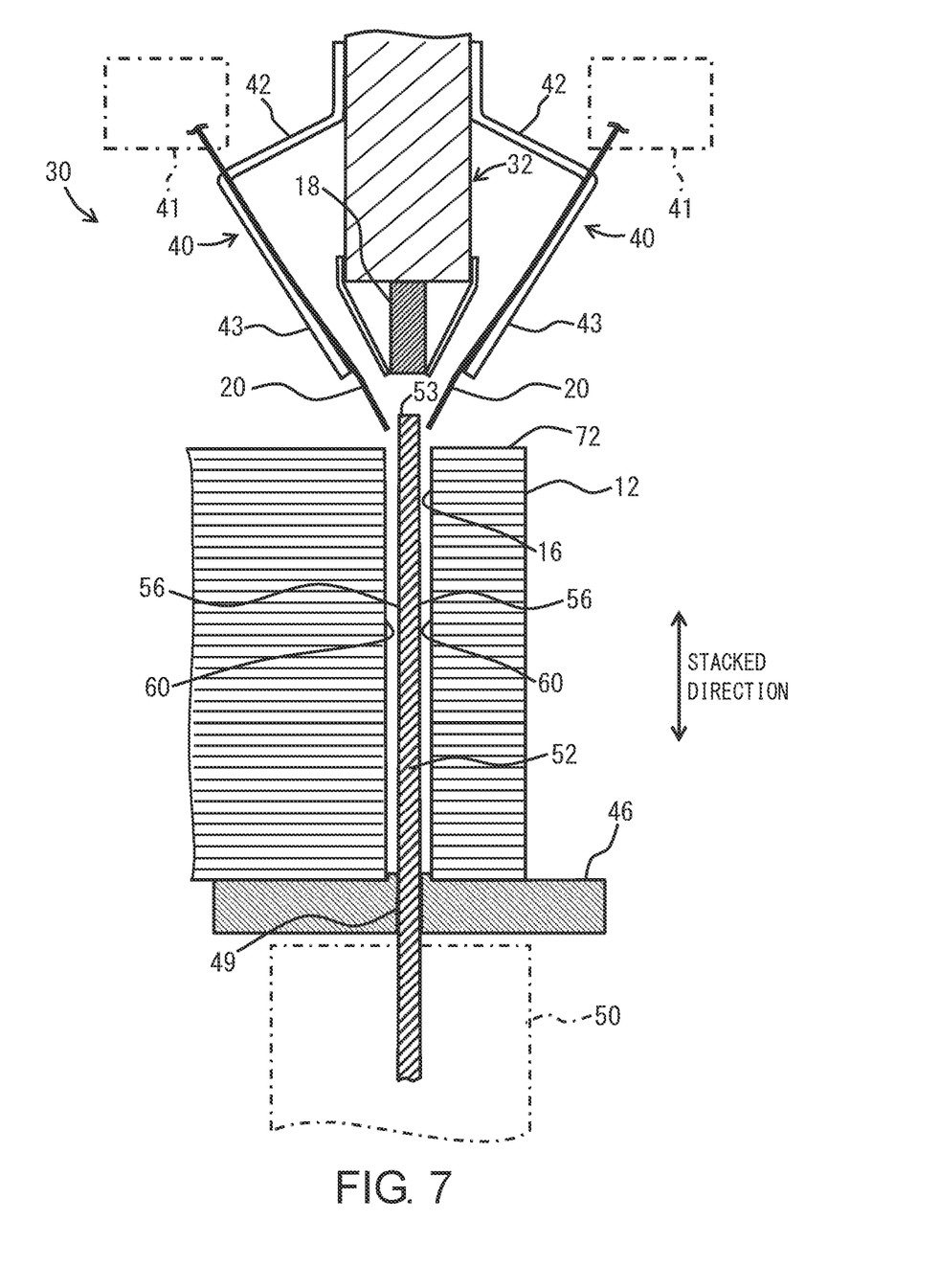
FIG. 7 is a figure illustrating a guide inserting step.

The guide 52 is a rod-like member having a uniform cross section and extending in a vertical direction, and it is inserted into the magnet insertion hole 16 from the lower side to the upper side of the rotor core 12 by the guide driving portion 50 as shown in FIG. 7. FIG. 4 is a top view of the rotor core 12 showing the state (shown in FIG. 7) where the guide 52 is inserted into the magnet insertion hole 16. In the top view of the rotor core 12, the guide 52 has an outer contour having a size reduced uniformly by a prescribed proportion from the shape of the magnet insertion hole 16. In the top view of the rotor core 12, the two sheets 20 are inserted into the magnet insertion hole 16 along side surfaces 56 of two long sides (hereinafter referred to as long-side side surfaces 56) of the guide 52.

In FIG. 3, the guide driving portion 50 is provided below the stage 46. The guide driving portion 50 is an actuator which inserts each guide 52 into the corresponding magnet insertion hole 16 by moving from the lower part to the upper part and also pulls out each guide 52 from the corresponding magnet insertion hole 16 by moving from the upper part to the lower part.

The magnet feeding portion 32 includes a main body 34 which holds the upper part of the permanent magnet 18 within it, and a tip end portion 36 which directs the lower part of the permanent magnet 18 toward the magnet insertion hole 16. The main body 34 of the magnet feeding portion 32 loosens the gripping of the permanent magnet 18 to lower the permanent magnet 18 by gravity, thereby feeding the permanent magnet 18 into the magnet insertion hole 16.

Figure 5:
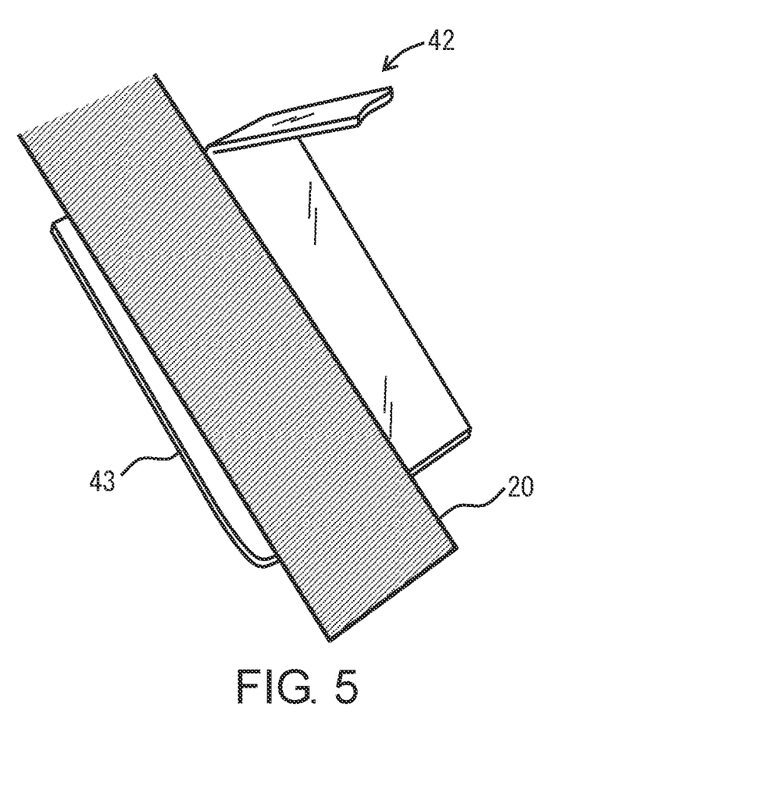
FIG. 5 is a perspective view partially showing a sheet feeding arm.

The two sheet-feeding portions 40 are provided opposite each other with the magnet feeding portion 32 therebetween. Each of the two sheet-feeding portions 40 includes a sheet feeding source 41 which has the sheet 20 wound in a roll state, and a sheet feeding arm 42 which is connected to the side surface of the main body 34 of the magnet feeding portion 32 to receive the supply of the sheet 20 from the sheet feeding source 41. The two sheet-feeding portions 40 have a right and left symmetrical structure with the magnet feeding portion 32 held between them. FIG. 5 is a perspective view partially showing the left-side sheet feeding arm 42 of FIG. 3. The sheet feeding arm 42 is provided with a sheet feeding plate 43 on which the sheet 20 from the sheet feeding source 41 is placed. The sheet feeding plate 43 is inclined obliquely downward so that the sheet 20 moves from the sheet feeding source 41 toward the magnet insertion hole.

Figure 6:
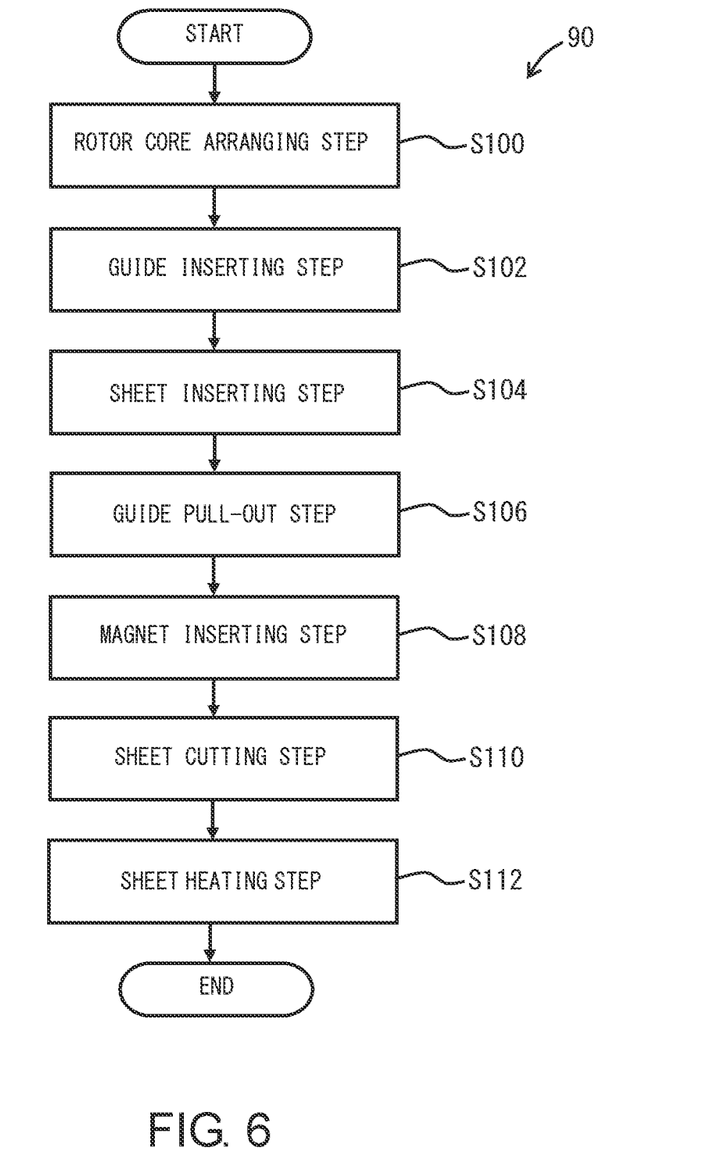
FIG. 6 is a flow chart showing a flow of a rotor manufacturing method.

A rotor manufacturing method using the rotor manufacturing apparatus 30 is next described. FIG. 6 is a flowchart showing the flow of a rotor manufacturing method 90. In the flowchart of FIG. 6, the first step S100 (the rotor core arranging step) and the final step S112 (sheet heating step) are conducted only one time for the rotor core 12, and S102 to S110 are steps conducted on the respective magnet insertion holes of the rotor core 12.

In S100, the rotor core 12 made by stacking electromagnetic steel plate is first provided such that the stacked direction of the electromagnetic steel plates becomes a vertical direction (arranging step). This is a step to arrange the rotor core 12 on the stage 46 as shown in FIG. 3.

As shown in FIG. 7, in S102, the guide 52 is moved from the lower part to the upper part by the guide driving portion 50 to insert the guide 52 into the magnet insertion hole 16 (guide inserting step). At this time, the tip end portion of the guide 52 is protruded beyond an upper end surface 72 of the rotor core 12 by the guide driving portion 50. The part of the guide 52 protruded from the upper end surface 72 of the rotor core 12 is hereinafter called the guide protrusion portion 53.

As shown in FIG. 4 (viewing the state of FIG. 7 from above the rotor core 12), two long-side side surfaces 56 of the guide 52 along which two sheets are arranged are parallel to an inner surface 60 of the magnet insertion hole 16 which is opposite each of the long-side side surfaces 56. In other words, a uniform gap is formed between the long-side side surface 56 of the guide 52 and the inner surfaces 60 of the magnet insertion hole 16, so that the gap does not have a partially narrowed part. Therefore, when the sheets are inserted into the magnet insertion hole 16, the tip end portion of the sheet can be prevented from being caught partially by the inner surface 60 of the magnet insertion hole 16.

Figure 8:
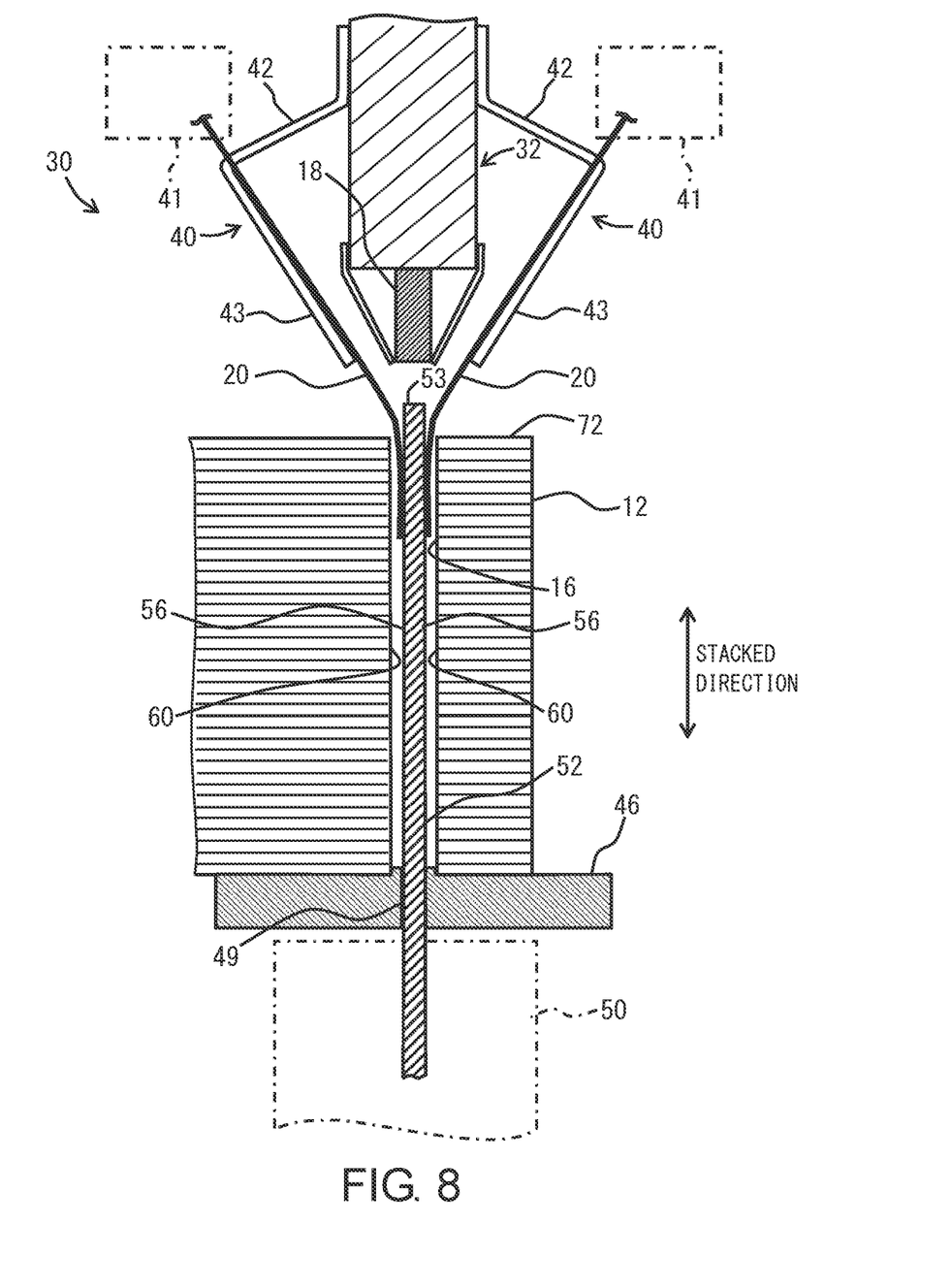
FIG. 8 is a figure illustrating a sheet inserting step.

Next, in S104 of FIG. 6, the two sheets 20 are inserted simultaneously from above the rotor core 12 into the magnet insertion hole 16 along the two long-side side surfaces 56 of the guide 52 (sheet inserting step). At this time, the two sheet-feeding portions 40 feed the sheets 20 from the sheet feeding sources 41 as shown in FIG. 7 to feed the sheets 20 from diagonally above by the sheet feeding plates 43 onto the side surfaces of the guide protrusion portion 53. Thereby, the two sheets 20 enter the magnet insertion hole 16 along the two long-side side surfaces 56 of the guide 52 as shown in FIG. 8.

Figure 9:
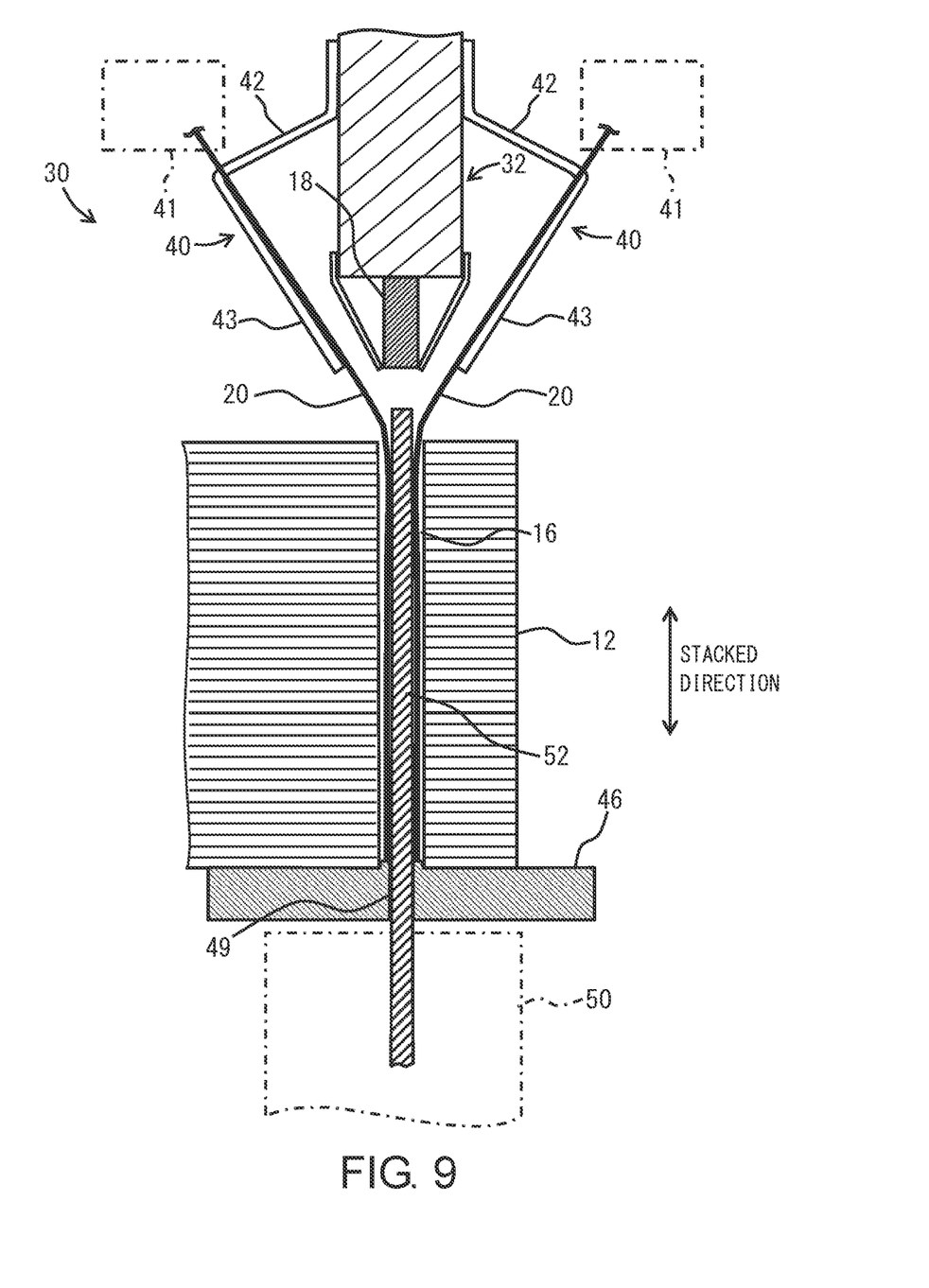
FIG. 9 is a figure illustrating a sheet inserting step.

As shown in FIG. 9, the two sheet-feeding portions 40 stop feeding the sheets 20 when the sheets 20 reach the lower end portion of the magnet insertion hole 16. When the sheet inserting step is completed, as shown in FIG. 9, the two sheets 20 come to have a state that they extend from the magnet insertion hole 16 to widen upward toward the respective sheet feeding sources 41.

Figure 10:
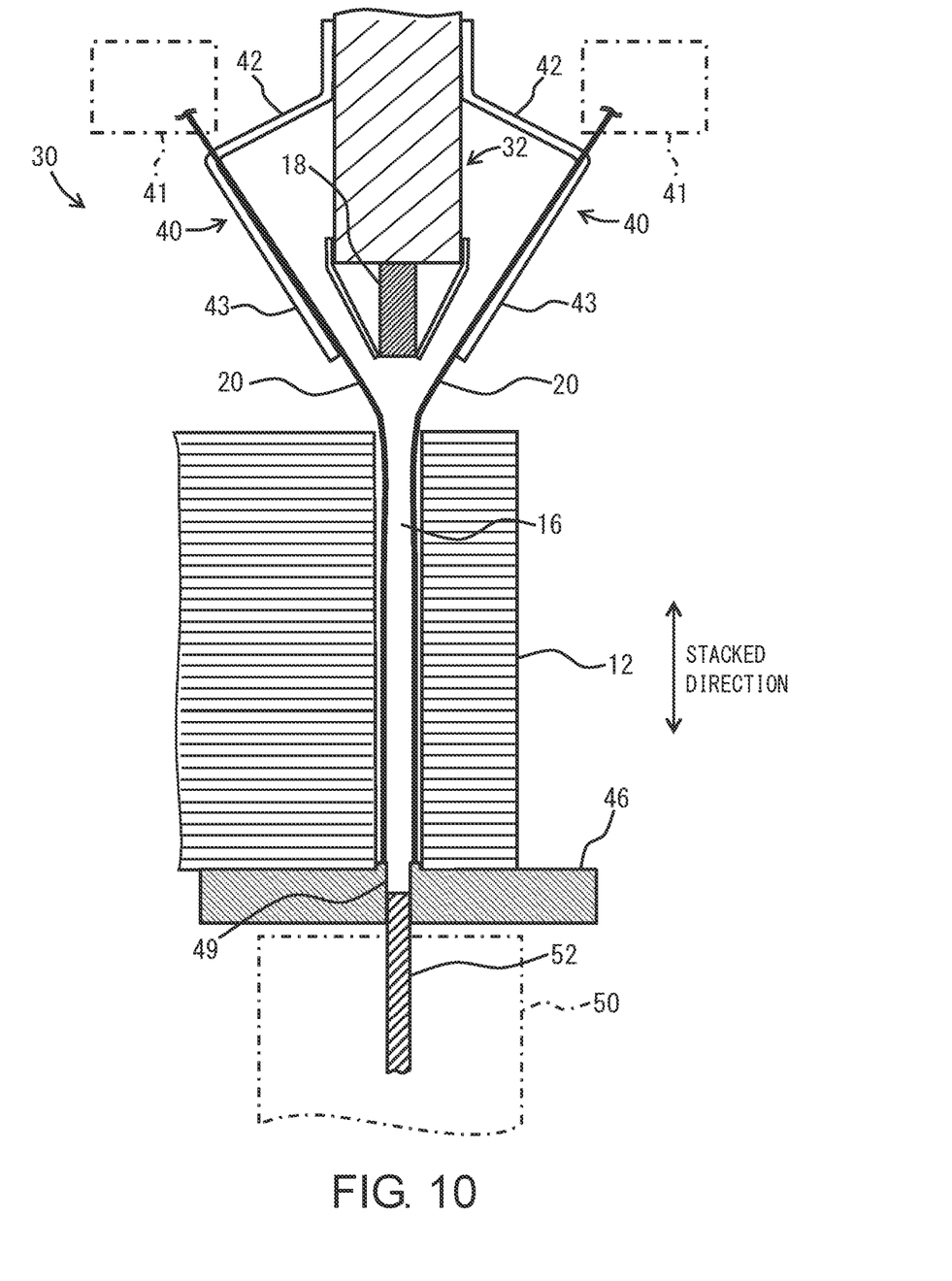
FIG. 10 is a figure illustrating a guide pull-out step.

Then, as shown in FIG. 10, in S106 of FIG. 6, the guide 52 is moved downward by the guide driving portion 50 and pulled out from the magnet insertion holes 16 (guide pull-out step).

Figure 11:
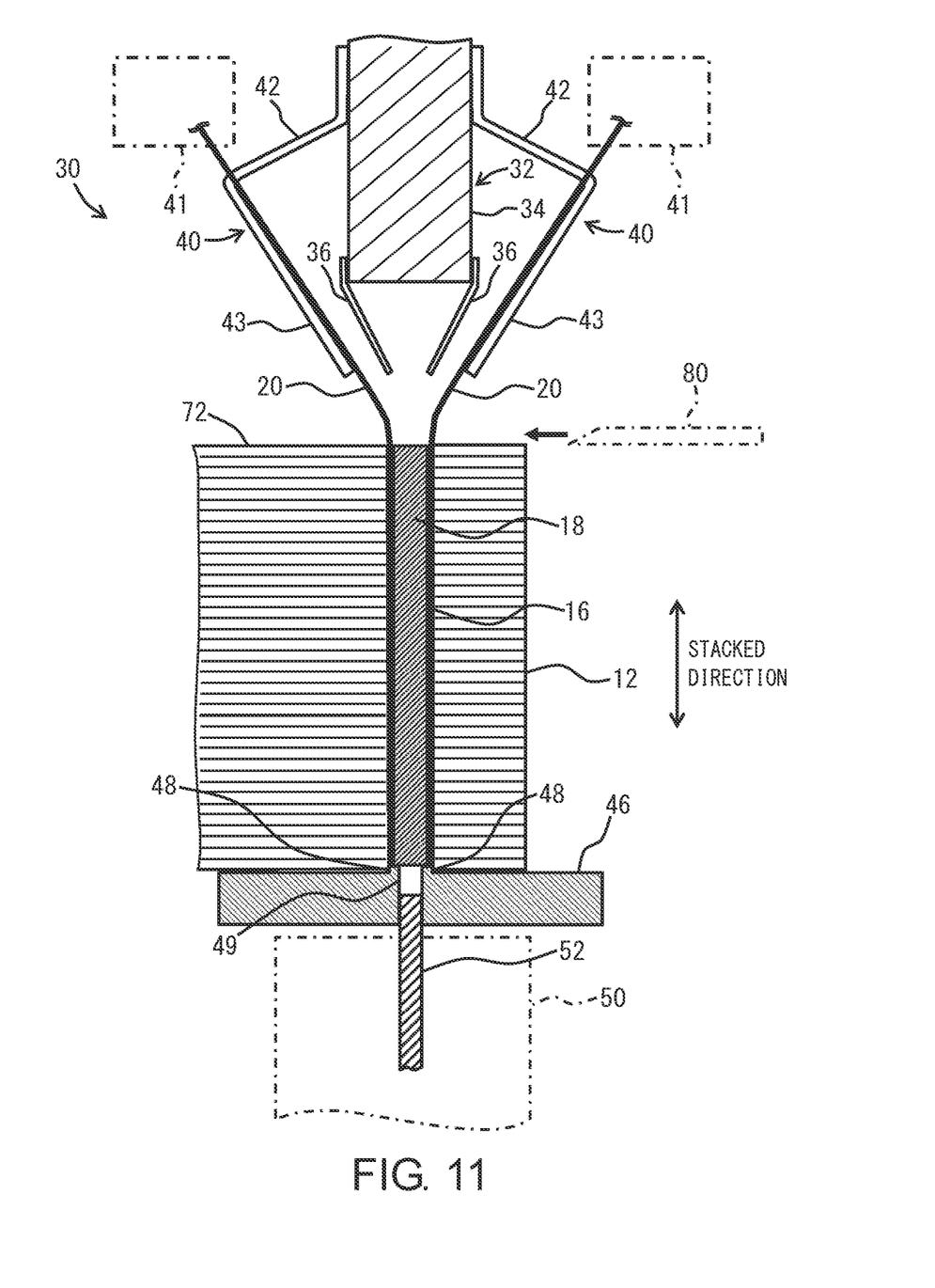
FIG. 11 is a figure illustrating a magnet inserting step and a sheet cutting step.

As shown in FIG. 11, in S108 of FIG. 6, the main body 34 of the magnet feeding portion 32 loosens or releases the holding of the permanent magnet 18 to insert the permanent magnet 18 into the magnet insertion hole 16 from between two sheets 20 widened upward (magnet inserting step). At this time, the permanent magnet 18 is guided to move toward the magnet insertion hole 16 by the tip end portion 36 of the magnet feeding portion 32. The permanent magnet 18 is guided into the magnet insertion hole 16 by the two sheets 20 widened upward. The permanent magnet 18 is lowered by gravity within the magnet insertion hole 16 and supported by the protrusion 48 of the stage 46 after reaching that position.

As shown in FIG. 11, in S110 of FIG. 6, the two sheets 20 are cut off by a cutter 80 along the upper end surface 72 of the rotor core 12 (sheet cutting step). The two sheets within the magnet insertion hole 16 are supported by the protrusion 48 of the stage 46.

Then, the two sheets 20 within the magnet insertion holes 16 are heated in S112, and the sheets 20 in all the magnet insertion holes 16 are heated at once after the processing on all the magnet insertion holes 16 is completed in S102 to S110. After the two sheets 20 and the permanent magnet 18 are arranged in one magnet insertion hole 16, the upper set (of the magnet feeding portion 32 and the two sheet-feeding portions 40) provided above the rotor core 12 moves and positions above the next magnet insertion hole 16, and the two sheets 20 and the permanent magnet 18 are arranged into the magnet insertion hole 16. In this way, the two sheets 20 and the permanent magnet 18 are provided within the respective magnet insertion holes 16. Two or more upper sets may be provided to perform processing of two or more magnet insertion holes 16 at the same time.

For insertion of the permanent magnets 18 to reach the lower end portions of the magnet insertion holes 16, there may be employed a configuration such that after the permanent magnets 18 are inserted into all the magnet insertion holes 16, the lower surface at the inner periphery side of the rotor core 12 is slightly lifted up by another stage, the respective protrusions 48 of the stage 46 are exposed from the respective magnet insertion holes 16, and the respective permanent magnets 18 are inserted to reach the lower end portions of the respective magnet insertion holes 16.

Figure 12:
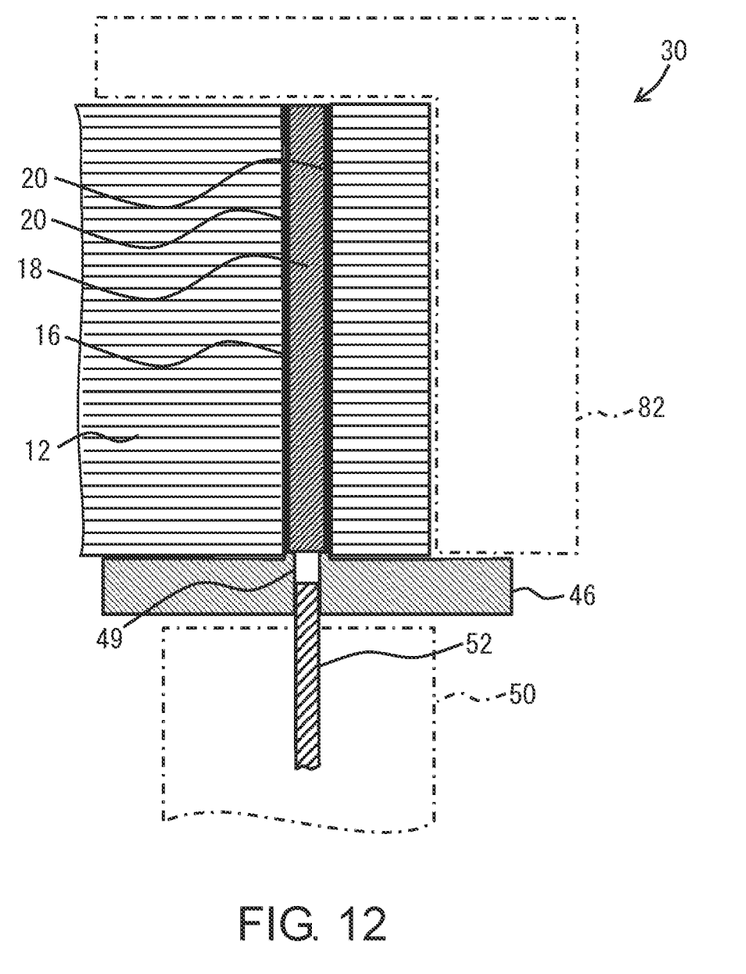
FIG. 12 is a figure illustrating a sheet heating step.
Figure 13:
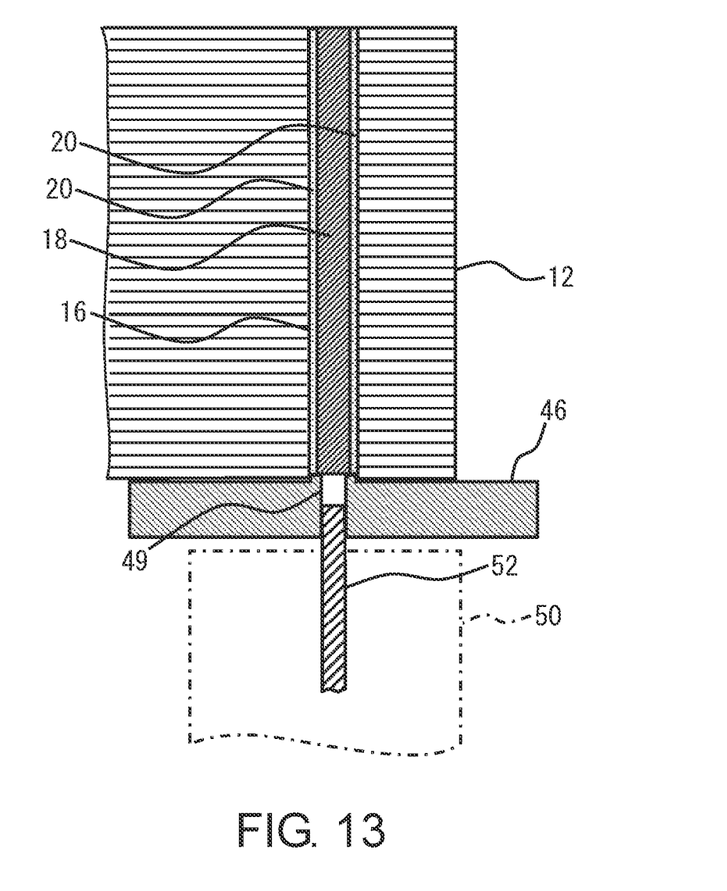
FIG. 13 is a figure illustrating a state of a rotor after the sheet heating step.

As shown in FIG. 12, in S112 of FIG. 6, a heater 82 is approached to the outer peripheral side of the rotor core 12 and positioned near each of the magnet insertion holes 16, then the respective sheets 20 within the respective magnet insertion holes 16 are heated by the heater 82 (sheet heating step). Thus, as shown in FIG. 13, the sheets 20 within the magnet insertion holes 16 are expanded to fill the gaps between the side surfaces of the permanent magnets 18 and the inner surfaces of the magnet insertion holes 16 to fix the permanent magnets 18 within the magnet insertion holes 16. In this embodiment, the sheet heating step is performed after the two sheets 20 and the permanent magnet 18 are provided in all the magnet insertion holes 16, but the sheet heating step may be performed every time the two sheets 20 and the permanent magnet 18 are provided in one magnet insertion hole 16. By the above processing, the manufacture of the rotor 10 by the rotor manufacturing apparatus 30 is completed.

Since the rotor core 12 is configured by stacking the electromagnetic steel plates, the inner surface of the magnet insertion hole 16 has minute irregularities. According to the above-described rotor manufacturing method 90, the two sheets 20 are inserted into the magnet insertion hole 16 along the two long-side side surfaces 56 of the guide 52, so that the tip end portions of the sheets 20 can be prevented from moving to the inner surface 60 of the magnet insertion hole 16. Therefore, the tip end portions of the sheets 20 are not caught or are not easily caught by the irregularities of the inner surface of the magnet insertion hole 16, and the tip end portions of the sheets 20 can be prevented from being bent or chipped.

If the guide 52 is not provided, when the two sheets 20 are fed simultaneously on right and left sides into the magnet insertion hole 16, there is a possibility that one of the sheets 20 is pushed by the other and its end portion is possibly moved to the inner surface of the magnet insertion hole 16. Particularly, since the sheet 20 of this embodiment is made of a brittle material containing glass fibers, the sheet tip end portion is possibly chipped when it advances toward the inner surface of the magnet insertion hole 16 and is caught by the minute irregularities of the inner surface. However, such a situation can be prevented by the above-described rotor manufacturing method 90.

The rotor manufacturing method of another embodiment is described next. In the above-described embodiment, the sheet 20 is arranged on the two long-side side surfaces 19 of the permanent magnet 18 (see FIG. 2), but alternatively, the sheet 20 may be provided on the two short-side side surfaces 19A of the permanent magnets 18. Further alternatively, the sheet 20 may be arranged on all the side surfaces 19, 19A of the permanent magnets 18.

Figure 14:
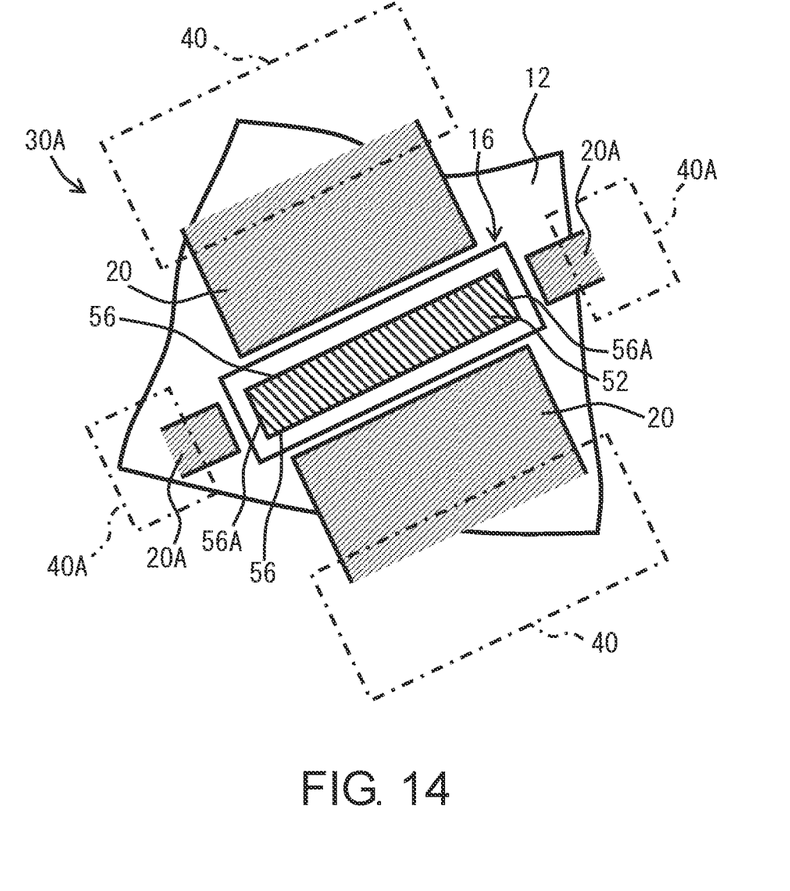
FIG. 14 is a figure illustrating a rotor manufacturing apparatus of another embodiment.

FIG. 14 is a figure schematically showing a rotor manufacturing apparatus 30A by which sheets 20, 20A are arranged on all the side surfaces of the permanent magnet. This figure shows sheet feeding portions 40, 40A of the rotor manufacturing apparatus 30A viewed from above, and the magnet feeding portion of the rotor manufacturing apparatus 30A is omitted. It is shown that the guide 52 is inserted into one magnet insertion hole 16 of the rotor core 12 but the sheets 20, 20A are not yet inserted into the magnet insertion hole 16. The rotor manufacturing apparatus 30A has the same structure as the above-described rotor manufacturing apparatus 30 except the sheet feeding portion. The manufacture of the rotor by the rotor manufacturing apparatus 30A is the same as the manufacture of the rotor by the above-described rotor manufacturing apparatus 30 except for the sheet inserting step.

In addition to the two sheet-feeding portions 40 for feeding the sheets 20 onto two long-side side surfaces 56 of the guide 52, the rotor manufacturing apparatus 30A is provided with the two sheet-feeding portions 40A for feeding the sheets 20A onto two short-side side surfaces 56A (side surfaces of the short-side side of the guide 52 in a top view of the rotor core 12) of the guide 52. The two sheet-feeding portions 40 and the two sheet-feeding portions 40A are arranged on the respective side surfaces of the main body (not shown) of the magnet feeding portion and positioned above the rotor core 12.

For the manufacture of the rotor by the rotor manufacturing apparatus 30A, the sheet inserting step includes insertion of the two sheets 20 from the two sheet-feeding portions 40 into the magnet insertion hole 16 along the two long-side side surfaces 56 of the guide 52, and insertion of the two sheets 20A from the two sheet-feeding portions 40A into the magnet insertion hole 16 along the two short-side side surfaces 56A of the guide 52. Thus, the sheets 20, 20A are inserted simultaneously. After the insertion of the sheets 20, 20A is completed, the guide extracting step, the magnet inserting step, the sheet cutting step, and the sheet heating step are conducted similarly to the above-described rotor manufacturing method.

The present rotor manufacturing method can also prevent the tip end portions of the respective sheets 20, 20A from moving to the inner surface of the magnet insertion hole 16 and can prevent the tip end portions of the respective sheets 20, 20A from being bent or chipped, because the four sheets 20, 20A are inserted into the magnet insertion hole 16 along the side surfaces 56, 56A of the guide 52.

The invention claimed is:

1. A rotor manufacturing method comprising:
   an arranging step for arranging a rotor core, which is formed by stacking electromagnetic steel plates, to direct the stacked electromagnetic steel plates toward a vertical direction,
   a guide inserting step for inserting a rod-like guide into a magnet insertion hole formed to extend in the stacked direction of the rotor core after the arranging step,
   a sheet inserting step for inserting a plurality of sheets from above the rotor core into the magnet insertion hole along different side surfaces of the guide after the guide inserting step,
   a guide pull-out step for pulling out the guide from the magnet insertion hole after the sheet inserting step, and
   a magnet inserting step for inserting a permanent magnet between the plurality of sheets within the magnet insertion hole after the guide pull-out step.

2. The rotor manufacturing method according to claim 1, wherein:
   the guide is inserted into the magnet insertion hole from below the rotor core so to protrude as a guide protrusion portion a part of the guide from the upper end surface of the rotor core in the guide inserting step, and
   the plurality of sheets are fed onto different side surfaces of the guide protrusion portion from obliquely above in the sheet inserting step.

3. The rotor manufacturing method according to claim 1, wherein:
   in the sheet inserting step, the plurality of side surfaces of the guide along which the plurality of sheets are arranged are parallel to the inner surface of the magnet insertion hole which is opposite each of the side surfaces of the guide in a top view of the rotor core.

4. The rotor manufacturing method according to claim 1, wherein:
   when the sheet inserting step is completed, the plurality of sheets are extended toward the respective sheet feeding sources to widen upward above the magnet insertion hole, and
   in the magnet inserting step, the permanent magnet is inserted into the magnet insertion hole through the plurality of sheets widened upward.

5. The rotor manufacturing method according to claim 4, wherein:
   the respective sheets have a property of expanding by heating, and
   the rotor manufacturing method further comprises:
   a sheet cutting step for cutting off the respective sheets on an upper end surface of the rotor core after the magnet inserting step, and
   a sheet heating step for heating the respective sheets within the magnet insertion hole after the sheet cutting step.

* * * * *